(12) United States Patent
Foo

(10) Patent No.: US 7,771,079 B2
(45) Date of Patent: Aug. 10, 2010

(54) COMPACT REFLECTOR FLUORESCENT LAMP WITH GOOD HEAT DISPERSION

(75) Inventor: Onn Fah Foo, Kowloon (HK)

(73) Assignee: Mass Technology (H.K.) Ltd., Kowloon (HK)

( * ) Notice: Subject to any disclaimer, the term of this patent is extended or adjusted under 35 U.S.C. 154(b) by 226 days.

(21) Appl. No.: 12/030,288

(22) Filed: Feb. 13, 2008

(65) Prior Publication Data
US 2008/0192485 A1 Aug. 14, 2008

(30) Foreign Application Priority Data
Feb. 14, 2007 (CN) .................. 2007 2 0000768

(51) Int. Cl.
*F21V 15/01* (2006.01)
(52) U.S. Cl. .................. 362/221; 362/217.05; 362/260; 362/296.01; 362/294
(58) Field of Classification Search .................. 362/221, 362/217.05, 260, 296.01, 310, 362, 294
See application file for complete search history.

(56) References Cited
U.S. PATENT DOCUMENTS 5,189,339 A * 2/1993 Peshak .................. 315/58
6,492,773 B2 * 12/2002 Gyoten et al. .................. 315/56
6,709,133 B2 * 3/2004 Lin et al. .................. 362/260
7,053,540 B2 * 5/2006 Bobel .................. 313/318.1
7,513,646 B2 * 4/2009 Catone et al. .................. 362/216

FOREIGN PATENT DOCUMENTS

CN 2670742 Y 1/2005

* cited by examiner

*Primary Examiner*—Jong-Suk (James) Lee
*Assistant Examiner*—Leah S Lovell
(74) *Attorney, Agent, or Firm*—Rabin & Berdo, P.C.

(57) ABSTRACT

A compact reflector fluorescent lamp unit includes a lamp cap, a lamp tube, an electronic ballast assembly, a circuit board, a housing, an intermediate plate, a reflection cup, and a transparent plate. The intermediate plate and the housing, the intermediate plate and the circuit board, and the intermediate plate and the reflection cup are tightly assembled together. The reflection cup is connected to a lower surface of the intermediate plate and arranged independently underneath the housing, and has an internal surface having a high degree of fineness, and an external surface having a high degree of roughness by frosted finishing, thereby allowing the radiation heat generated through the body of the reflection cup to be dissipated by the external surface.

14 Claims, 5 Drawing Sheets

COMPACT REFLECTOR FLUORESCENT LAMP WITH GOOD HEAT DISPERSION

TECHNICAL FIELD

The present invention relates to a fluorescent lamp, and more particularly to a compact reflector fluorescent lamp unit with good heat dispersion.

BACKGROUND OF THE INVENTION

At the present day, an existing reflector fluorescent lamp unit is configured by adopting an energy saving lamp tube around which a conical glass reflection shield is mounted. Such a unit makes use of the convergent action of the glass reflection shield to achieve the object of orientated illumination. Though the unit can solve the problem of poor optical efficiency of a conventional energy saving lamp, it suffers from the poor heat dispersion because both the reflection shield and the electronic ballast are mounted in the housing of the energy saving lamp and the reflection shield is generally made of glass such that the radiation heat of the lamp tube cannot sufficiently dissipate to outside, which seriously shortens the lifespan of the circuit board mounted inside the energy saving lamp, and the reflection shield of such energy saving lamp is prone to damage in use and in the process of transportation.

In the Chinese Utility Model Patent CN2670742 (application number 200320100262.2) issued to the same applicant of the present invention, a compact reflector fluorescent lamp unit having a metallic reflection cup and a plastic casing specifically designed for enhancing the optical efficiency and minimizing the volume thereof is disclosed, wherein the plastic casing integrates with the lamp tube, reflection cup, electronic ballast assembly and lamp base, thereby forming a closely packed and properly assembled compact reflector fluorescent lamp unit in the form of a reflector lamp, but the heat dispersion of the unit is still dissatisfactory. The disclosure of this patent is incorporated herein in its integrity for reference.

SUMMARY OF THE INVENTION

An object of the present invention is to overcome the defects of the foregoing prior art by providing a compact reflector fluorescent lamp having better configuration and heat dispersion.

The technical solution for achieving the above object is a compact reflector fluorescent lamp unit, comprising a lamp cap, a lamp tube, an electronic ballast assembly connected with the lamp cap and the lamp tube, a circuit board, a housing and an intermediate plate for enclosing the electronic ballast assembly and the circuit board, a reflection cup, and a transparent plate mounted on an open end of the reflection cup; wherein the electronic ballast assembly is mounted on the circuit board via fastenings, and the electronic ballast assembly and the circuit board are then jointly mounted in the housing;

the circuit board is provided with a plurality of insertion holes, each of the insertion holes is formed by riveting a hollow rivet made of a conducting material;

the housing is provided with a mounting hole arranged at its top surface for mounting the lamp cap, an annular recess arranged on an inner circumferential wall at its bottom, and a plurality of snap-fit members arranged above and adjacent to the annular recess;

the intermediate plate consists of a base plate and an annular boss protruding upwardly and circumferentially from inside of periphery of the base plate, on an upper surface of the base plate a plurality of electrical connection pins corresponding to the insertion holes of the circuit board are arranged, and on a lower surface of the base plate at least two protrusions and a hollow protrusion located the at least two protrusions are arranged; and a plurality of snap-fit legs corresponding to the snap-fit members of the housing are arranged between the outside of the annular boss and the periphery of the base plate; wherein the electrical connection pins of the intermediate plate are plugged into the insertion holes of the circuit board, the snap-fit legs are coupled with the snap-fit members of the housing, and the annular boss are engaged with the annular recess of the housing thereby enabling them to be closely coupled and relatively fixed; and the reflection cup is a cavity in which the lamp tube can be received, and has a top surface which is provided with a plurality of assembly holes corresponding to the number of protrusions of the intermediate plate, and a notch arranged at one side of the assembly holes; and the reflection cup is fixed at a lower surface of the intermediate plate by virtue of the coupling of the assembly holes and the protrusions of the intermediate plate and by the coupling of the notch and the hollow protrusion of the intermediate plate.

In a preferred embodiment of the present invention, the number of the insertion holes of the circuit board, the connection pins of the intermediate plate, the snap-fit members of the housing, and the snap-fit legs of the intermediate plate is four respectively.

Preferably, the housing might be devised to be in the form of a step sleeve. More preferably, the housing might be composed of two to five superimposing step-tiers, and the annular recess is arranged at bottom part of the lowest step-tier, and a plurality of positioning ribs are arranged on an inner circumferential wall of upper part of the lowest step-tier and match with a peripheral edge of the circuit board. Optimally, the housing might be composed of three superimposing step-tiers, and the lowest step-tier is in a trumpet shape, and above the lowest step-tier are two cylindrical shaped step-tiers of diameters which are decreased stepwisely with respect to the lowest step-tier. Generally, the housing is made of plastic material.

In another preferred embodiment of the present invention, two protrusions in axial symmetry are arranged on the lower surface of the intermediate plate, while two assembly holes in axial symmetry and corresponding to the two protrusions are arranged on a top surface of the reflection cup.

The reflection cup of the present invention is generally made of metal, such as an aluminum alloy. The reflection cup has an internal surface having a high degree of fineness by polishing or chemical treatment and an external surface having a high degree of roughness by frosted finishing. Preferably, a circular recess might be arranged on an inner wall of the bottom of the reflection cup, a circular boss matching with the circular recess might be arranged at the periphery of the transparent plate. By a combination of the engagement of the circular boss with the circular recess and adhesive the transparent plate can be held in the circular recess of the reflection cup, and a top edge of the reflection cup might be in tight coupling with the bottom of the housing by adhesive.

The lamp cap of the present invention can be of two-pin type lamp cap and/or of screwed type lamp cap, and is mounted on the top surface of the housing or the mounting hole on the top surface of the housing. The lamp tube might be mounted within the reflection cap and can be selected from a 2SL type, 2WL type, or 4SL type compact fluorescent lamp tube. According to an embodiment, the legs of the lamp tube are inserted into the electrical connection pins of the intermediate plate to allow the lamp tube to be snap-fitted into the hollow protrusion of the intermediate plate and held therein by adhesive.

It can be thus seen that the compact reflector fluorescent lamp unit with good heat dispersion of the present invention employs a snap-fit or coupling mechanism as a main means and uses adhesive as an auxiliary means for the connections respectively between the intermediate plate and the circuit board, between the intermediate plate and the housing, between the intermediate plate and the reflection cup, and between the reflection cup and the transparent plate, thereby enabling these components to be properly arranged and tightly coupled. In this way, the assembling of the housing, the intermediate plate and the reflection cup will thus be very convenient and reliable. Further, the reflection cup is connected to the lower surface of the intermediate plate, which means that it is arranged independently underneath the housing, and moreover, the reflection cup is made of metal materials such as an aluminum alloy, and has an internal surface which has a high degree of fineness by polishing or chemical treatment to facilitate light reflection, and an external surface which has a high degree of roughness by frosted finishing, thereby allowing the radiation heat generated by the lamp tube in operation to be conducted through the body of the reflection cup and to disperse extensively through the rough external surface such that the heat can effectively dissipated to the outside of the reflection cup. The compact reflector fluorescent lamp unit of the present invention has several advantages over the conventional reflector fluorescent lamp in that it is compact in appearance, small in volume, good in heat dispersion, long in lifespan and hard to broken.

BRIEF DESCRIPTION OF THE DRAWINGS

The present invention will be described further by way of example with reference to the accompany drawings for easier understanding of these and other features of the present invention while the compact reflector fluorescent lamp unit with good heat dispersion of the present invention is not limited to the embodiments set forth hereinafter, wherein:

FIG. 1b is a sectional view of the compact reflector fluorescent lamp unit illustrated in FIG. 1a;

DETAILED DESCRIPTION OF THE PREFERRED EMBODIMENTS

Figure 1A:
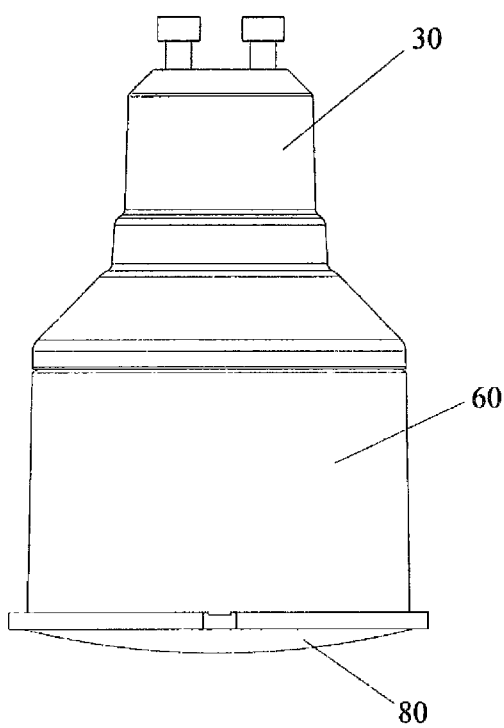
FIG. 1a is a front view of a compact reflector fluorescent lamp unit with good heat dispersion constructed according to a preferred embodiment of the present invention.
Figure 1B:
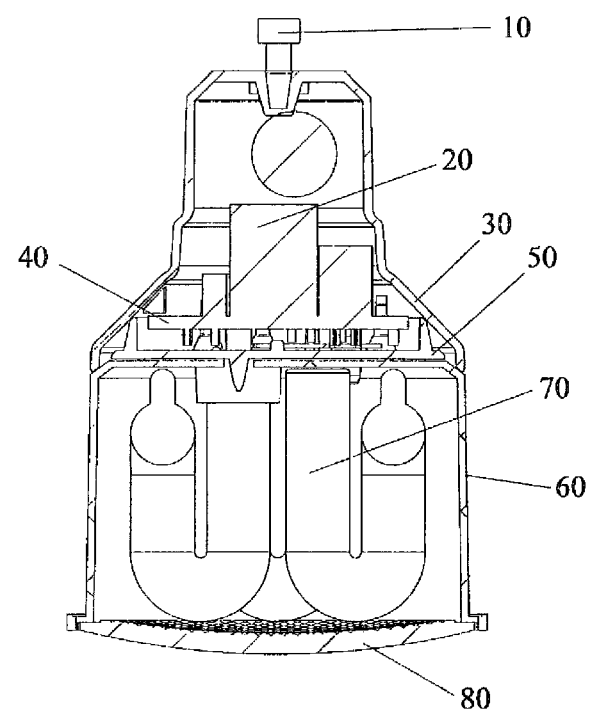

Referring to FIGS. 1a and 1b, compact reflector fluorescent lamp unit with good heat dispersion consistent with a preferred embodiment of the present invention is illustrated, comprising a lamp cap 10, an electronic ballast assembly 20, a housing 30, a circuit board 40, an intermediate plate 50, a reflection cup 60, a lamp tube 70, and a transparent plate 80. The lamp cap 10 may adopt a two-pin type lamp cap and/or a screwed type lamp cap, and in the present embodiment, a two-pin type lamp cap having two conducting contact protrusions, such as a GU10 lamp cap, is used as the lamp cap.

The electronic ballast assembly 20 is a conventional ballast which can be used in combination with lamp tubes of various standards and model numbers. An input end of the electronic ballast assembly 20 may be connected to the conducting contact protrusions of the lamp cap 10 via conductors, and an output end of the electronic ballast assembly 20 can be connected to the lamp tube 70.

Figure 2:
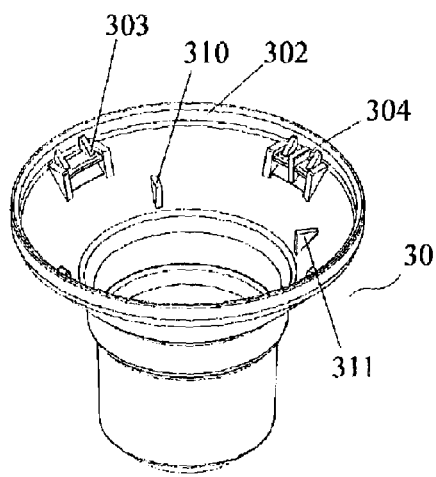
FIG. 2 is a perspective view of a housing of the compact reflector fluorescent lamp unit illustrated in FIGS. 1a and 1b.
Figure 3B:
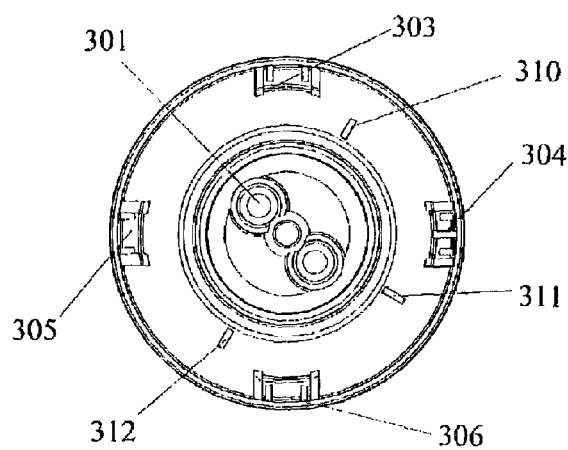
FIG. 3b is an elevated view of the housing illustrated in FIG. 2.
Figure 3A:
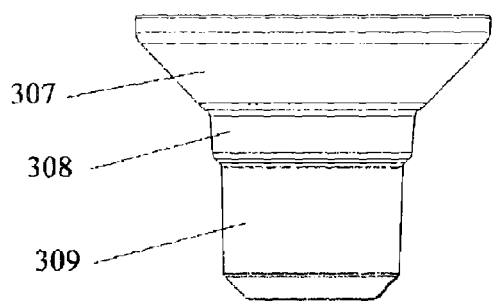
FIG. 3a is a front view of the housing illustrated in FIG. 2.

FIGS. 2, 3a and 3b illustrate that the housing 30 made of plastic is in the form of a step sleeve in which the ballast is arranged. The housing 30 is provided with a mounting hole 301 arranged at its top surface for mounting the lamp cap, an annular recess 302 arranged on an inner circumferential wall at its bottom, and four protruding snap-fit members 303-306 arranged on the inner circumferential wall and evenly distributed above and adjacent to the annular recess 302. To be specific, the housing 30 is composed of three superimposing step-tiers 307-309. The lowest step-tier 307 is in a trumpet shape, and above the lowest step-tier 307 are two cylindrical shaped step-tiers 308, 309 of diameters which are decreased stepwisely with respect to the lowest step-tier 307. The annular recess 302 is arranged at lower part of the lowest step-tier 307, and three inwardly protruding positioning ribs 310-312 are arranged on an inner circumferential wall of upper part of the lowest step-tier 307.

Figure 4:
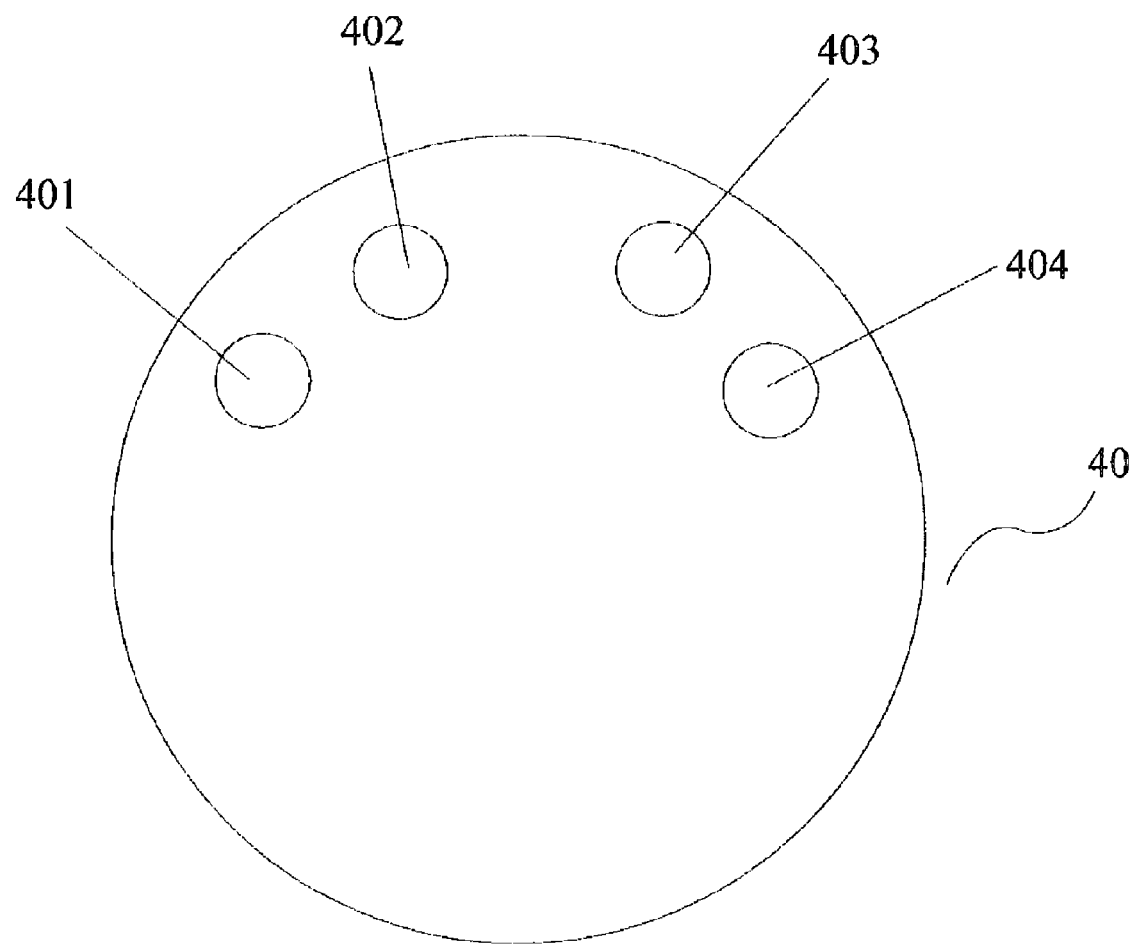
FIG. 4 is a plan view of a circuit board of the compact reflector fluorescent lamp unit illustrated in FIGS. 1a and 1b.

On the circuit board 40 four apertures are provided, all the four apertures have a hollow rivet made of a conducting material respectively to form four insertion holes 401-404 for electrical connection, as shown in FIG. 4. In this way, the electronic ballast assembly 20 can be mounted on the circuit board 40 via fastenings or other coupling arrangements. After the mounting of the electronic ballast assembly 20 on the circuit board 40, they are jointly mounted into the housing 30, and a peripheral edge of the circuit board 40 is matched up to the positioning ribs 310-312 of the housing, thereby the circuit board 40 can be held within the housing 30.

Figure 5A:
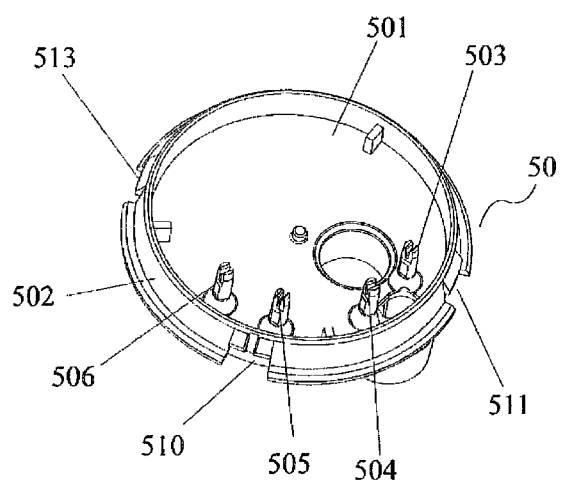
FIG. 5a is a perspective view of an intermediate plate of the compact reflector fluorescent lamp unit illustrated in FIGS. 1a and 1b, which illustrates the structural arrangement of the intermediate plate viewed from the top.
Figure 5B:
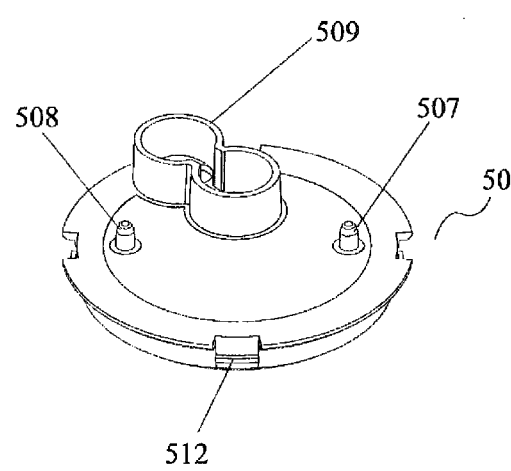
FIG. 5b is a perspective view of the intermediate plate of the compact reflector fluorescent lamp unit illustrated in FIGS. 1a and 1b, which illustrates the structural arrangement of the intermediate plate viewed from the bottom.

Referring now to FIGS. 5a and 5b, the intermediate plate 50 can be made into various shapes, for example, it can be made in the form of a circular disc or in a disk shape. The intermediate plate consists of a base plate 501 and an annular boss 502 protruding upwardly and circumferentially from inside of the periphery of the base plate, and the base plate 501 and the annular boss 502 are formed integrally. A plurality of electrical connection pins 503-506, having the number corresponding to the number of the insertion holes 401-404 of the circuit board, are arranged on an upper surface of the intermediate plate 50. In this embodiment, the number is four (see FIG. 5a). On a lower surface of the intermediate plate two protrusions 507, 508 in axial symmetry and a hollow protrusion 509 on one side of the two protrusions 507, 508 are arranged. The hollow protrusion 509 has a bore corresponding to a leg of the lamp tube. The corresponding number of snap-fit legs to the snap-fit members 303-306 of the housing, namely four snap-fit legs 510-513 in this embodiment, are evenly distributed on an outer wall between the annular boss 502 and the periphery of the base plate. When the intermediate plate is mounted in the housing 30 and below the circuit board 40, the electrical connection pins 503-506 can be plugged into the respective insertion holes 401-404 of the circuit board 40, such that they not only form an electric connection between the lamp tube 70 and the output end of the electronic ballast assembly 20, but also form a coupling which enables the circuit board to be fixed firmly on the intermediate plate. In addition, the snap-fit legs 510-513 of the intermediate plate are coupled with the snap-fit members 303-306 of the housing 30, and the annular boss 502 of the intermediate plate is engaged with the annular recess 302 of the housing 30, thereby enabling them to be closely coupled and relatively fixed, and allowing the electronic ballast assembly 20 to be firmly held in the housing 30 by the tight coupling between the intermediate plate and the housing, and allowing the bottom end of the housing to be sealed.

Figure 6:
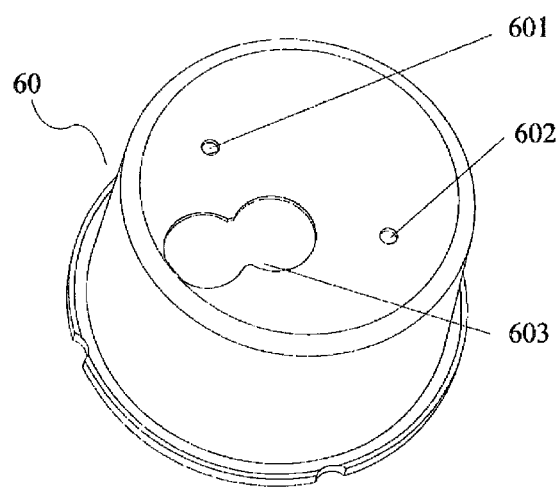
FIG. 6 is a perspective view of a reflection cup of the compact reflector fluorescent lamp unit illustrated in FIGS. 1a and 1b.
Figure 7:
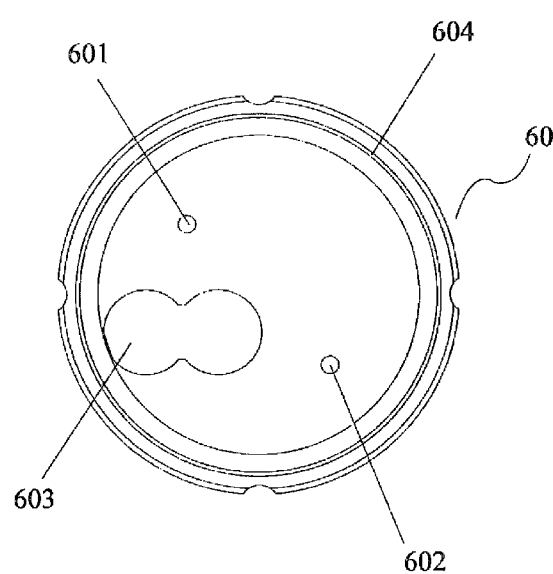
FIG. 7 is a front view of the reflection cup illustrated in FIG. 6.

As can be seen in FIGS. 6 and 7, the reflection cup 60 is a cavity in which the lamp tube can be received, The reflection cup can be varied for its size and shape according to the lamp tube to be used. A top surface of the reflection cup is provided with two assembly holes 601, 602 in axial symmetry and an opening (notch) 603 arranged at one side of the assembly holes 601, 602. Like the hollow protrusion 509 of the intermediate plate, the opening 603 can be varied for its size and shape according to the shape and position of the lamp tube. A circular recess 604 is arranged on an inner wall at the bottom of the reflection cup. The reflection cup is fixed at the lower surface of the intermediate plate 50 by virtue of the coupling of the assembly holes 601, 602 and the opening 603 with the protrusions 507, 508 and the hollow protrusion 509 of the intermediate plate, respectively. If necessary, they can be further fixed together firmly by use of adhesive, for example, the top edge of the reflection cup and the bottom of the housing can be tightly coupled by adhesive. Preferably, the reflection cup is made of metal such as aluminum alloy materials and the like, and more preferably aluminum alloy. The internal surface of the reflection cup has a high degree of fineness by polishing or chemical treatment to facilitate the reflection of light, and the external surface of the reflection cup has a high degree of roughness by frosted finishing to increase the area for dissipation of the radiation heat, thereby enhancing the heat dispersion of the lamp unit.

The lamp tube 70 might adopt any kinds of compact fluorescent lamp tube, and is preferably selected from a 2SL type, 2WL type, or 4SL type compact fluorescent tube. In the present embodiment, a 2SL2U type lamp tube is employed. There are four legs at both ends of the lamp tube 70, and the legs of the lamp tube are generally connected to the output end of the electronic ballast. In this way, the lamp tube can be snap-fitted into the corresponding bore of the hollow protrusion 509 of the intermediate plate and held therein by adhesive, while the four legs of the lamp tube is respectively coupled with the electrical connection pins 503-506 of the intermediate plate 50.

At the periphery of the transparent plate 80 a circular boss is provided for engagement with the circular recess 604 of the reflection cup 60 so as to enable the transparent plate to be received in the circular recess 604 of the reflection cup 60 and held therein by adhesive.

Having now fully described the configuration of this invention, it will be appreciated that a snap-fit or coupling mechanism is provided respectively between the intermediate plate and the housing, between the intermediate plate and the circuit board, between the intermediate plate and the reflection cup, and between the reflection cup and the transparent plate, thereby allowing the reflection cup, the intermediate plate and the housing to be easily, reasonably, tightly and reliably assembled together. Further, the reflection cup is made of aluminum alloy which facilitates the convergence of light rays for achieving a light beam with relatively small diameter and high intensity at its center. The external surface of the reflection cup has a high degree of roughness by frosted finishing, thereby allowing the radiation heat can be effectively conducted and dissipated through the reflection cup, such that the present invention possess the features of high optical efficiency, compact size, good heat dispersion and strong structure.

Summing up, the description presented hereinbefore relates to merely some of the preferred embodiments of the present invention. It should be appreciated that the technical solutions obtained by the skilled person in the art via corresponding changes on the basis of the prior art with reference to the teachings of the present invention shall all fall into the scope of the claims of the present invention.

What is claimed is:

1. A compact reflector fluorescent lamp unit, comprising:
   a lamp cap;
   a lamp tube;
   a circuit board having a plurality of insertion holes, each insertion hole having a hollow rivet made of a conducting material riveted therein;
   a housing having mounting holes arranged at a top surface thereof for mounting the lamp cap, having an annular recess arranged at a bottom thereof, and having a plurality of snap-fit members arranged on an inner circumferential wall of the housing and adjacent to the annular recess;
   an intermediate plate having a base plate having an upper surface and an opposing lower surface, the upper surface having an annular boss thereon which protrudes upwardly from inside of a periphery of the base plate, the annular boss being engaged with the annular recess of the housing, the upper surface further having a plurality of electrical connection pins corresponding to the insertion holes of the circuit board, the electrical connection pins being plugged into the corresponding insertion holes of the circuit board, the lower surface of the base plate having at least two protrusions, and a hollow protrusion located on one side of the at least two protrusions, the intermediate plate further having a plurality of snap-fit legs corresponding to the snap-fit members of the housing and being arranged between the periphery of the base plate and an outside of the annular boss, the snap-fit legs being coupled with the snap-fit members of the housing;
   an electronic ballast assembly connected with the lamp cap and the lamp tube, and being mounted on the circuit board, so that the electronic ballast assembly and the circuit board are jointly installable in the housing so as to be enclosed by the housing and intermediate plate;
   a reflection cup having a cavity in which the lamp tube is received, a top surface of the reflection cup having a plurality of assembly holes corresponding to the at least two protrusions of the intermediate plate and a notch located at one side of the assembly holes, the reflection cup being fixed at the lower surface of the intermediate plate by coupling the assembly holes and the at least two protrusions of the intermediate plate together, and by coupling the notch and the hollow protrusion of the intermediate plate together; and a transparent plate mounted on an open end of the reflection cup.

2. A reflector fluorescent lamp unit of claim 1, wherein a number of the insertion holes of the circuit board, the connection pins of the intermediate plate, the snap-fit members of the housing, and the snap-fit legs of the intermediate plate is four, respectively.

3. A reflector fluorescent lamp unit of claim 1, wherein the housing is in the form of a step sleeve.

4. A reflector fluorescent lamp unit of claim 3, wherein the housing includes two to five superimposed step-tiers, and the annular recess is arranged at a lower part of the lowest step-tier, and a plurality of positioning ribs are arranged on an inner circumferential wall of an upper part of the lowest step-tier, and match with a peripheral edge of the circuit board.

5. A reflector fluorescent lamp unit of claim 4, wherein the housing includes three superimposed step-tiers, with the lowest step-tier being in a trumpet shape, and above the lowest step-tier are two cylindrical-shaped step-tiers having diameters which are decreased stepwise with respect to the lowest step-tier.

6. A reflector fluorescent lamp unit of claim 1, wherein the housing is made of plastic material.

7. A reflector fluorescent lamp unit of claim 1, wherein the two protrusions on the lower surface of the intermediate plate are arranged in axial symmetry, and the two assembly holes on the top surface of the reflection cup are arranged in axial symmetry.

8. A reflector fluorescent lamp unit of claim 1, wherein the reflection cup is made of metal and has a reflective internal surface with a high degree of fineness, and has a frosted-finished external surface having a high degree of roughness.

9. A reflector fluorescent lamp unit of claim 8, wherein the reflection cup is made of an aluminum alloy.

10. A reflector fluorescent lamp unit of claim 1, wherein a circular recess is arranged on an inner wall at a bottom of the reflection cup, and a circular boss matching the circular recess is arranged at a periphery of the transparent plate, the circular boss of the transparent plate being embedded in the circular recess of the reflection cup, and a top edge of the reflection cup being in tight coupling engagement with the bottom of the housing.

11. A reflector fluorescent lamp unit of claim 10, wherein the circular boss of the transparent plate and the circular recess of the reflection cup are adhered together using an adhesive, and the top edge of the reflection cup and the bottom of the housing are adhered together using an adhesive.

12. A reflector fluorescent lamp unit of claim 1, wherein the lamp cap is a bipost type or screw type.

13. A reflector fluorescent lamp unit of claim 1, wherein the lamp tube is mounted within the reflection cap and is a 2SL type, 2WL type, or 4SL type compact fluorescent lamp tube.

14. A reflector fluorescent lamp unit of claim 1, wherein the lamp tube is engaged in the hollow protrusion of intermediate plate and fixed therein using an adhesive, with respective legs of lamp tube being coupled with the electrical connection pins of the intermediate plate.

* * * * *